United States Patent
Caulfield et al.

(10) Patent No.: US 9,977,679 B2
(45) Date of Patent: May 22, 2018

(54) APPARATUS AND METHOD FOR SUSPENDING EXECUTION OF A THREAD IN RESPONSE TO A HINT INSTRUCTION

(71) Applicant: ARM Limited, Cambridge (GB)

(72) Inventors: Ian Michael Caulfield, Cambridge (GB); Antony John Penton, Cambridge (GB); Robert Gwilym Dimond, Cambridge (GB)

(73) Assignee: ARM Limited, Cambridge (GB)

( * ) Notice: Subject to any disclaimer, the term of this patent is extended or adjusted under 35 U.S.C. 154(b) by 387 days.

(21) Appl. No.: 14/935,820

(22) Filed: Nov. 9, 2015

(65) Prior Publication Data
US 2017/0132011 A1    May 11, 2017

(51) Int. Cl.
*G06F 9/30* (2018.01)
*G06F 9/38* (2018.01)

(52) U.S. Cl.
CPC ......... *G06F 9/3867* (2013.01); *G06F 9/3009* (2013.01); *G06F 9/30058* (2013.01); *G06F 9/30072* (2013.01); *G06F 9/3802* (2013.01)

(58) Field of Classification Search
None
See application file for complete search history.

(56) References Cited

U.S. PATENT DOCUMENTS

| 6,477,639 B1* | 11/2002 | Krishnan | G06F 9/30058 712/233 |
| 8,990,602 B2* | 3/2015 | Guddeti | G06F 1/3228 713/300 |
| 2012/0260252 A1* | 10/2012 | Kuesel | G06F 9/4881 718/102 |

* cited by examiner

*Primary Examiner* — Corey S Faherty
(74) *Attorney, Agent, or Firm* — Nixon & Vanderhye P.C.

(57) ABSTRACT

An apparatus and method are provided for processing instructions from a plurality of threads. The apparatus comprises a processing pipeline to process instructions, including fetch circuitry to fetch instructions from a plurality of threads for processing by the processing pipeline, and execution circuitry to execute the fetched instructions. Execution hint instruction handling circuitry is then responsive to the fetch circuitry fetching an execution hint instruction for a first thread, to treat the execution hint instruction, at least in a presence of a suspension condition, as a predicted branch instruction with a predicted behavior, and to cause the fetch circuitry to suspend fetching of instructions for the first thread. The execution circuitry is then arranged to execute the predicted branch instruction with a behavior different to the predicted behavior, in order to trigger a misprediction condition. The fetch circuitry is then responsive to the misprediction condition to resume fetching of instructions for the first thread. This provides a reliable mechanism for temporarily suspending fetching of instructions for a thread in response to a hint instruction, whilst still reliably resuming fetching in due course.

15 Claims, 7 Drawing Sheets

APPARATUS AND METHOD FOR SUSPENDING EXECUTION OF A THREAD IN RESPONSE TO A HINT INSTRUCTION

BACKGROUND

The present technique relates to an apparatus and method for processing instructions from a plurality of program threads.

When executing instructions for multiple program threads, there can be periods of time where switching execution from one thread to another may improve overall throughput of instructions through the apparatus. For example, if at a certain point in time a delay may be expected in the processing of one thread, it may beneficial to seek to switch to execution of another thread. It is known for a programmer to use an execution hint instruction to indicate that such a delay is to be expected in connection with the thread in which the execution hint instruction has been added.

In a coarse-grained multithreading system where one particular thread is processed within a processing pipeline at a given time, and certain events such as periodic interrupts may trigger context switching between threads, such an execution hint instruction can be used as an additional trigger to switch context from the current thread to another thread.

However, in more fine-grained multithreading systems, it is possible for instructions from multiple threads to be resident within the pipeline at the same time, without any need for context switching between the threads. It would be desirable to allow performance improvements to be realised within such fine-grained multithreading systems, based on presence of such execution hint instructions.

SUMMARY

In a first example configuration, there is provided an apparatus comprising: a processing pipeline to process instructions, comprising fetch circuitry to fetch instructions from a plurality of threads for processing by the processing pipeline, and execution circuitry to execute the fetched instructions; execution hint instruction handling circuitry, responsive to the fetch circuitry fetching an execution hint instruction for a first thread in said plurality, to treat the execution hint instruction, at least in a presence of a suspension condition, as a predicted branch instruction with a predicted behaviour, and to cause the fetch circuitry to suspend fetching of instructions for the first thread; the execution circuitry being arranged to execute the predicted branch instruction with a behaviour different to said predicted behaviour in order to trigger a misprediction condition, and the fetch circuitry being responsive to the misprediction condition to resume fetching of instructions for the first thread.

In another example configuration, there is provided a method of operating an apparatus having fetch circuitry to fetch instructions from a plurality of threads for processing by a processing pipeline and execution circuitry within the processing pipeline to execute the fetched instructions, in response to the fetch circuitry fetching an execution hint instruction for a first thread in said plurality, the method comprising: treating the execution hint instruction, at least in a presence of a suspension condition, as a predicted branch instruction with a predicted behaviour; suspending fetching by the fetch circuitry of instructions for the first thread; executing, within the execution circuitry, the predicted branch instruction with a behaviour different to said predicted behaviour in order to trigger a misprediction condition; and responsive to the misprediction condition, causing the fetch circuitry to resume fetching of instructions for the first thread.

In a yet further example configuration, there is provided an apparatus comprising: processing pipeline means for processing instructions, comprising fetch means for fetching instructions from a plurality of threads for processing by the processing pipeline means, and execution means for executing the fetched instructions; execution hint instruction handling means, responsive to the fetch means fetching an execution hint instruction for a first thread in said plurality, for treating the execution hint instruction, at least in a presence of a suspension condition, as a predicted branch instruction with a predicted behaviour, and for causing the fetch means to suspend fetching of instructions for the first thread; the execution means for executing the predicted branch instruction with a behaviour different to said predicted behaviour in order to trigger a misprediction condition, and the fetch means for resuming fetching of instructions for the first thread in response to the misprediction condition.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
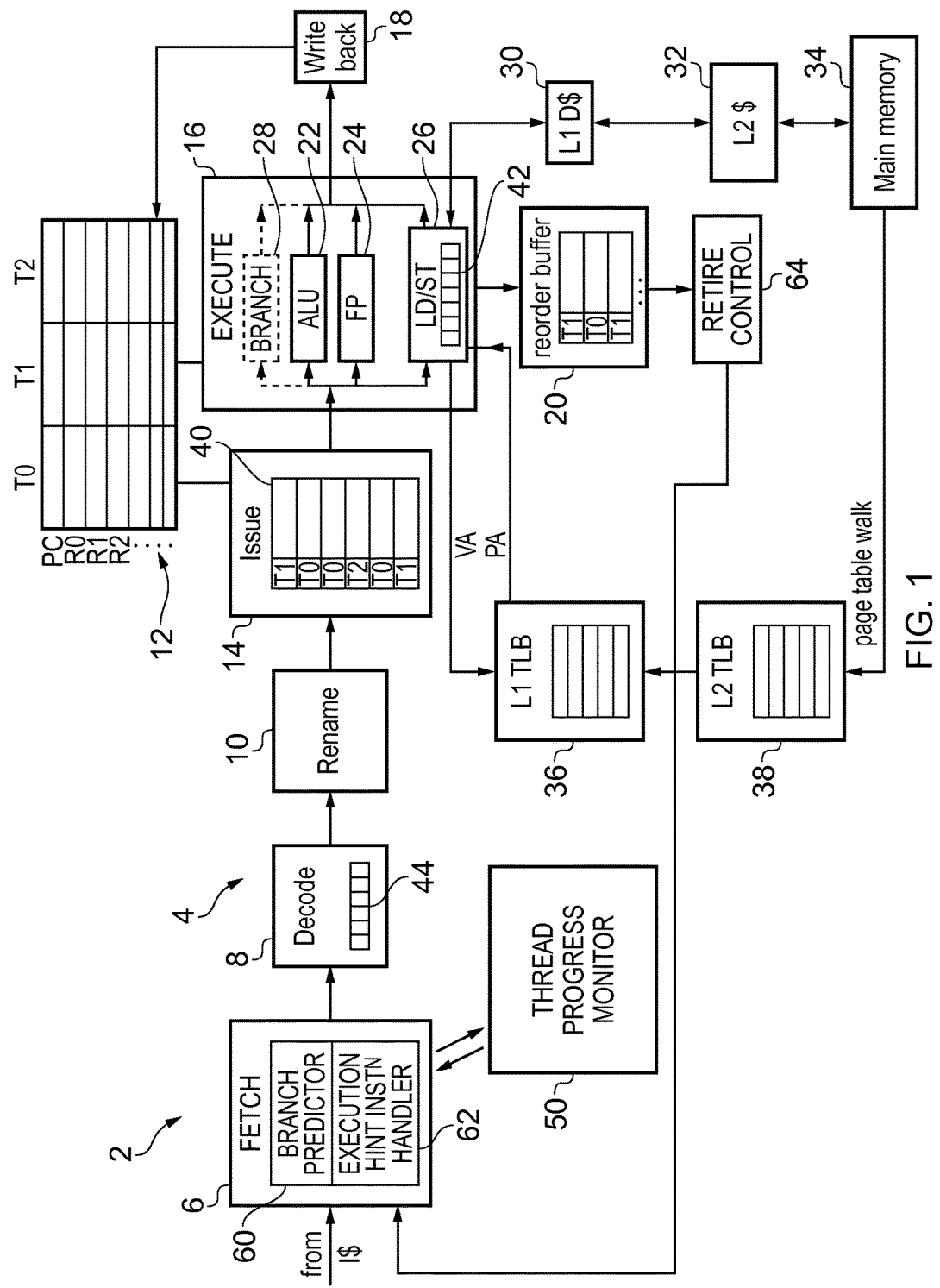
FIG. 1 is a block diagram of a data processing system in accordance with one embodiment.

Before discussing the embodiments with reference to the accompanying figures, the following description of embodiments is provided.

In the apparatus of the described embodiments, it is envisaged that instructions for multiple threads may be resident within the pipeline at the same time, hence implementing a fine-grained multithreading system. The described embodiments provide a mechanism within such a system to allow execution hint instructions to be used to temporarily suspend fetching of instructions for a particular thread, whilst providing a reliable mechanism to enable resumption of fetching of the instructions of that thread in due course.

More particularly, in one embodiment an apparatus is provided that comprises a processing pipeline to process instructions, including fetch circuitry to fetch instructions from a plurality of threads for processing by the processing pipeline, and execution circuitry to execute the fetched instructions. In addition, execution hint instruction handling circuitry is responsive to the fetch circuitry fetching an execution hint instruction for a first thread, to treat the execution hint instruction as a predicted branch instruction with a predicted behaviour, and to cause the fetch circuitry to suspend fetching of instructions for the first thread. The execution hint instruction handling circuitry may be arranged to treat the execution hint instruction in this way in all instances, or only in the presence of a suspension condition. The execution circuitry is then arranged to execute the predicted branch instruction with a behaviour different to the predicted behaviour, in order to trigger a misprediction condition. The fetch circuitry is then responsive to the misprediction condition to resume fetching of instructions for the first thread.

Accordingly, by such an approach, this addresses the issue of how to reliably resume fetching of instructions for a suspended thread when suspending fetching in response to an execution hint instruction. In particular, whilst coarse-grained multithreading systems may employ events such as periodic interrupts to trigger context switching between the threads, such periodic interrupts cannot be relied upon within a fine-grained multithreading system where multiple threads can be resident within the pipeline at the same time. Hence, whilst a particular thread could be suspended in response to the execution hint instruction, it is necessary to ensure that a reliable mechanism is in place for resuming fetching of instructions for that thread at an appropriate point.

In accordance with the above described embodiment, the apparatus makes use of existing mechanisms for handling predicted branch instructions. In particular, by treating the execution hint instruction as a branch instruction, and ensuring that the predicted behaviour for that branch instruction differs from the behaviour that will occur when that branch instruction is executed by the execution circuitry, this will ensure that when the hint instruction is actually executed by the execution circuitry, a misprediction condition will be triggered. At this point, the fetch circuitry is then responsive to the misprediction condition to resume fetching of instructions for the suspended thread. Accordingly by such an approach, the suspension of fetching will occur whilst the hint instruction is passing through the pipeline, but resumption of fetching of instructions for the thread is reliably triggered in due course following the processing of that hint instruction by the execution circuitry, and in particular by the hint instruction being handled as a predicted branch instruction that has been mispredicted.

The predicted behaviour that is associated with the hint instruction when it is treated as a branch instruction can take a variety of forms. For example, it may be that the branch instruction is predicted as being taken, but in due course the execution circuitry is arranged to process the branch instruction as not being taken. However, in an alternative embodiment the predicted behaviour is that a branch specified by the predicted branch instruction will not be taken, and the execution circuitry is arranged to take the branch during execution of the predicted branch instruction. In such an arrangement, the predicted branch instruction used to represent the hint instruction can be presented as a predicted branch to the instruction following the hint instruction within the first thread. Then, when the execution circuitry subsequently takes the branch during execution of the predicted branch instruction, the fetch circuitry will be caused to begin fetching from the target address, i.e. the instruction directly following the execution hint instruction within the first thread.

The misprediction condition can be evaluated at a variety of points within the processing pipeline following execution of the predicted branch instruction by the execution circuitry. In one embodiment, the processing pipeline further comprises retire circuitry to retire each instruction after execution by the execution circuitry, the retire circuitry being arranged to detect the misprediction condition and to cause the fetch circuitry to resume fetching of instructions for the first thread. Hence, by such an approach, it will be appreciated that fetching of instructions in connection with the first thread will be suspended for the duration of time between the execution hint instruction handling circuitry having determined to treat the execution hint instruction as a predicted branch instruction, and that instruction subsequently being retired from the processing pipeline. During that period of time, the processing pipeline's resources can be allocated to the handling of other threads, hence potentially improving the overall throughput of the processing pipeline.

In one embodiment, the processing pipeline supports out of order execution of instructions, and the retire circuitry is arranged, for each thread, to retire instructions in an original program order for the thread. In such an embodiment, by waiting for the retire circuitry to evaluate a misprediction condition and trigger resumption of fetching of instructions by the fetch circuitry, it is ensured that even if the instructions of the first thread are handled out of order within the processing pipeline, they are back in order by the time they are retired by the retire circuitry. Hence, by way of example, if the execution hint instruction follows a particular instruction in the original program order, where that particular instruction is expected to incur a significant delay, for example due to it being expected that a long latency cache miss will occur when processing that instruction, this will ensure that by the time the hint instruction is retired, that particular preceding instruction will also have been retired, and accordingly an appropriately timed suspension in the fetching of instructions for the first thread will have occurred.

In one embodiment, the execution hint instruction handling circuitry may be arranged to always treat the execution hint instruction as the predicted branch instruction and suspend fetching, and hence without evaluating any suspension condition. This allows a simplification of the processing performed by the execution hint instruction handling circuitry.

However, in an alternative embodiment, the execution hint instruction handling circuitry is arranged to perform an evaluation process to evaluate progress of the other threads in said plurality in order to determine whether the suspension condition is present. By such an approach, the execution hint instruction handling circuitry can be arranged to evaluate whether there would be expected to be any benefit in suspending the first thread. The execution hint instruction handling circuitry can take into account a variety of factors when performing the evaluation process, but essentially is seeking to determine whether any of the other threads also being processed by the processing pipeline are making sufficient progress to warrant suspending the first thread.

Hence, purely by way of example, if the only other thread or threads currently allocated to the processing pipeline are currently halted, or are being subjected to significant delays, for example due to long latency cache misses, then it may be inappropriate to suspend processing of the first thread, since this would not be expected to assist throughput of those other threads during the period that the first thread is suspended. However, if at least one other thread is currently making good progress, then it may be appropriate to suspend the first thread, since there is an expectation that this may well improve the throughput of that other thread.

In one embodiment, the apparatus further comprises thread progress monitoring circuitry to maintain information about instructions from the plurality of threads being executed within the processing pipeline, and the execution hint instruction handing circuitry is arranged to reference the thread progress monitoring circuitry when performing said evaluation process.

The thread progress monitoring circuitry can take a variety of forms, but in one embodiment can take the form of existing circuitry that is already provided to keep track of the state of the various instructions being processed through the pipeline.

In one embodiment, the evaluation process is arranged to identify that the suspension condition is present when the processing pipeline is providing a throughput for at least one of the other threads in said plurality that exceeds a threshold level.

In one embodiment, in the absence of the suspension condition, it is determined that it is not appropriate to suspend fetching of instructions for the first thread. In one particular embodiment, this is achieved by still treating the execution hint instruction as a predicted branch instruction. In particular, in one embodiment, in the absence of said suspension condition, the execution hint instruction handling circuitry is arranged to treat the execution hint instruction as a predicted branch instruction with an alternative predicted behaviour, and to allow the fetch circuitry to continue fetching instructions for the first thread. The execution circuitry is then arranged to execute the predicted branch instruction with a behaviour matching that alternative predicted behaviour. Since the predicted behaviour matches the actual behaviour, no misprediction condition arises, and accordingly execution merely continues.

In one particular embodiment, the alternative predictive behaviour is that the branch instruction is predicted as taken, and when the predicted branch instruction is executed, it is indeed taken. In one such embodiment, the target address for the predicted branch instruction can be set equal to the instruction following the hint instruction within the first thread. Since fetching has continued whilst the hint instruction is passing through the pipeline, then taking the branch when executing the predicted branch instruction merely indicates that the next instruction in program order within the first thread should be executed, and that instruction will already have been fetched.

Such an approach provides a particularly efficient implementation, since irrespective of whether the suspension condition exists or not, the hint instruction is treated as a predicted branch instruction, but with the predicted behaviour being changed so as to bring about the required behaviour, depending on whether it is desired to suspend fetching or not.

The execution hint instruction can take a variety of forms, but in one embodiment is a yield instruction indicating that prioritising execution of instructions of at least one other thread in said plurality may improve overall throughput of instructions through the apparatus. The yield instruction can be inserted by a programmer for a variety of reasons. For example, the programmer may realise that the preceding instruction is likely to cause a miss in the data cache, and accordingly a significant delay is likely to be incurred. Alternatively, the programmer may merely want to indicate that processing of the current thread should be deprioritised for a period of time, with the yield instruction being included as a hint to the apparatus that it may wish to suspend fetching of instructions from that thread for a period of time. As discussed earlier, whether suspension of fetching of instructions for that thread will or will not improve overall throughput will depend on the progress currently being made by the other threads.

However, there is no requirement for the execution hint instruction to be a yield instruction, and indeed it can take a variety of different forms. For example, in an alternative embodiment the execution hint instruction is a wait for a required condition type of instruction which, when executed by the execution circuitry in the presence of said required condition, causes the first thread to continue execution, but which when executed by the execution circuitry in the absence of said required condition, causes the first thread to be suspended until the required condition is present for the apparatus. The suspension condition may be determined to be present if the required condition is absent at the time the execution hint instruction is evaluated by the execution hint instruction handling circuitry.

Such a wait for a required condition type of instruction can take a variety of forms. For example, two known forms are a "wait for event" instruction or a "wait for interrupt" instruction. The event or interrupt may in one embodiment be provided from an external source and asserted at an input of the apparatus. In the absence of such an event or interrupt being present at the time the instruction is executed, this causes the relevant thread to be suspended until the event or interrupt arrives.

By treating the suspension condition as being present if the required condition is absent at the time the execution hint instruction is evaluated, this again allows fetching to be suspended for a period of time, with the aim of seeking to improve overall throughput by enabling other threads to be prioritised during that suspension period.

In one embodiment, when the execution hint instruction is executed by the execution circuitry in the presence of said required condition, the fetch circuitry is responsive to the misprediction condition to resume fetching of instructions for the first thread. When the execution hint instruction is instead executed by the execution circuitry in the absence of said required condition, then irrespective of whether a further misprediction condition arises due to the required condition having been present at the time the execution hint instruction was evaluated by the execution hint instruction handling circuitry, the first thread is suspended until the required condition is present for the apparatus.

Hence, if the required condition is present at the time the wait for a required condition type of instruction is executed, then no suspension is required by the encoded functionality of the instruction itself. However, due to its preceding handling by the execution hint instruction handling circuitry, a temporary suspension of fetching has taken place, and can now be resumed in response to the misprediction (arising due to the absence of the required condition at the time the instruction was evaluated, and the presence of the required condition at the time it is executed).

However, if the required condition is absent when the execution of the wait for a required condition type of instruction occurs, then the above described functionality ensures that the instruction is handled as intended, and accordingly suspension of the first thread then takes place until the required condition does arise.

Particular embodiments will now be described with reference to the figures.

The present technique for handling execution hint instructions may be particularly useful in a processing pipeline which supports a form of fine-grained multi-threading, for example simultaneous multithreading (SMT). In an SMT system, the processing pipeline may include at least one pipeline stage configured to hold in flight instructions from multiple threads concurrently. Unlike conventional pipelines which may support multiple threads on a coarse grained basis so that one particular thread is processed at a given time and periodic interrupts may trigger context switching between threads, with register state associated with the old thread being saved to memory so that the same registers may be used for storing data for the new thread, with an SMT system multithreading is supported at a more fine grained level so that instructions from multiple threads can be resident within the pipeline at once. Each instruction may be tagged with an identifier identifying which of the threads that instruction belongs to. Multiple sets of registers may be provided for handling the architectural state associated with each thread, so that it is not necessary to perform state saving or state restoration operations when switching between threads.

Whilst an example embodiment will be described hereafter with reference to an SMT system, the technique can also be useful in a variety of other systems, for example a more-traditional fine-grained multi-threading system. In such a system, each pipeline stage of the processing pipeline may be configured to hold in flight instructions from a single thread, but one pipeline stage may hold in flight instructions from a different thread to another pipeline stage. With such an approach, rather than each instruction being tagged with a thread identifier, each pipeline stage may have a shared thread identifier which identifies the thread from which each of the instructions in that pipeline stage was fetched.

FIG. 1 illustrates one example arrangement of a data processing apparatus that supports SMT multithreading.

More particularly, FIG. 1 schematically illustrates an example of a data processing apparatus 2 having a processing pipeline 4 for processing instructions from multiple threads. The pipeline includes a number of pipeline stages including: a fetch stage 6 for fetching instructions from an instruction cache or memory; a decode stage 8 for decoding the fetched instructions; a register rename stage 10 for performing register renaming to map architectural register specifiers specified by instructions to physical register specifiers identifying physical registers 12 provided in hardware for storing data to be processed in response to the instruction; an issue stage 14 for issuing instructions for execution; an execute stage 16 for executing instructions; and a write back stage 18 for writing back the results of the executed instructions to the registers 12. In some cases the write back stage 18 could be considered part of the execute stage 16. It will be appreciated that this is just an example of the stages which could be provided in the pipeline and other examples may have different arrangements of pipeline stages.

In this example, the pipeline supports out-of-order execution of instructions so that the issue stage 14 may issue instructions for execution by the execute stage 16 in a different order to the order in which the instructions were fetched from the instruction cache by the fetch stage 6. This can be useful for improving performance since when one instruction is waiting for an earlier instruction to complete so that it can use the result of that instruction, a later instruction in the program order which is independent of the earlier instruction can continue. The renaming stage 10 may allocate physical register specifiers from a pool of physical registers 12 which is larger than the number of architectural registers available in the architecture, to eliminate hazards between instructions specifying the same architectural register specifier, and hence improve the extent to which instructions can be reordered to improve performance. A reorder buffer 20 is provided to track completion of execution of instructions, which occurs when the instruction has both been executed by the execute stage 16 and the instruction has been committed. An instruction is committed once any earlier instructions whose outcome are required to be known before the later instruction is known to be correct have also completed. Hence, the issue stage 14 may issue some instructions for execution speculatively before the earlier instructions have completed and so the reorder buffer 20 may track whether instructions have already been executed or committed, and instructions may be retired from the reorder buffer 20 once they have been both executed and committed. Retire circuitry 64 may be used to manage the retiring of instructions from the reorder buffer 20.

The execute stage 16 may have a number of execute units for executing different kinds of instructions. For example, in FIG. 1 the execute stage 16 includes an arithmetic logic unit (ALU) 22 for executing arithmetic instructions such as adds, subtracts, multiply or divide or square root, and logical instructions such as bitwise AND, OR, NOR, or XOR operations or shift operations. The execute stage 16 may also have a floating point unit 24 for executing instructions using floating-point operands and a load/store unit 26 for executing load instructions to load data from a cache or memory into registers 12 or store instructions for storing data from the registers 12 to the cache or memory. Optionally a branch execution unit 28 may be provided for handling execution of branch instructions. Alternatively branch instructions may be executed within another unit such as the ALU 22.

As shown in FIG. 1, the memory system may include a number of levels of cache including a level 1 data cache 30, and a level 2 data cache 32. The level 2 data cache 32 may for example cache a subset of information from main memory 34 which can be accessed more quickly than if it had to be fetched from main memory. Similarly, the level 1 data cache 30 may cache a smaller subset of the data from the memory 34 for even quicker access. This is just one example of a possible cache hierarchy and other examples may have more or fewer levels of cache.

Load and store instructions may identify the storage location of the data to be fetched from the memory system using a virtual address, but the memory system may use a physical address which may be different. Hence, page table entries may be used to translate virtual addresses into physical addresses. A page table in main memory 34 may include a number of entries defining virtual to physical address translations for different pages of the address space. However, it can be slow to access these translation entries from the memory and so to speed up address translation a translation lookaside buffer (TLB) may be provided to cache a subset of page table entries for recently used address translations. In some cases multiple levels of TLB may be provided. For example in FIG. 1 the system includes a level 1 (L1) TLB 36 and a level 2 (L2) TLB 38. In response to an instruction specifying a virtual address, the load store unit 26 sends a request to the level 1 TLB 36 and the level 1 TLB 36 looks up its cache to determine whether it contains a page table entry for the required virtual address, and if so a physical address is returned. In some cases the page table entries may also include access permission data specifying whether instructions from a given thread or process may access each page and this may be used to determine whether the physical address is returned or an access violation is signalled. If the L1 TLB 36 does not include the required address translation data, then it requests it from the L2 TLB 38 which has a larger cache of page table entries. If the L2 TLB 38 does not contain the required data then a page table walk may be triggered to traverse page table structures in main memory 34 to identify the required entry.

The pipeline 4 supports simultaneous multithreading (SMT) so that tracking structures, such as an issue queue 40 for queuing instructions to be issued in the issue stage 14, a load/store queue 42 for queuing load or store instructions being processed, the reorder buffer 20, or a decode queue 44 for queuing instructions to be decoded may include instructions from several threads at a time. As shown for the issue queue 40 and the reorder buffer 20, instructions may be tagged with a thread identifier T0, T1 and T2 etc. to identify which threads the instructions belong to. It will be appreciated that a similar approach may be used for the decode queue 44 and the load/store queue 42. The physical registers 12 may include a number of register banks corresponding to the respective threads so that each thread's architectural state may be retained by the pipeline simultaneously, and it is not necessary to switch between threads using interrupts, context switches and state saving/restoration. Hence, the pipeline can simply execute a mixture of instructions from the respective threads, with the appropriate state in the registers 12 being updated depending on the thread identifiers of the instruction being processed.

As mentioned earlier, a programmer may include within a sequence of instructions one or more execution hint instructions providing a hint that it may be appropriate to switch execution from the current thread to another thread for a period of time in order to improve overall throughput of instructions. Whilst such instructions can be useful in coarse-grained multithreading systems, where periodic interrupt mechanisms and the like can be used to trigger context switching between threads, and accordingly there are regular opportunities to context switch back to a thread that has been temporarily suspended in response to an execution hint instruction, within a more fine-grained multithreading system such as an SMT system such mechanisms could not be relied upon, since as mentioned earlier in an SMT system is it expected that the pipeline will be processing instructions from multiple threads at any particular point in time, without any need for context switching between threads. An issue that hence arises is how to allow such a fine-grained multithreading system to derive any benefit from such execution hint instructions.

In accordance with the present technique, this is achieved by making use of branch prediction mechanisms provided within the pipeline, and by arranging for such execution hint instructions to be processed as branch instructions with particular properties. As shown in FIG. 1, a branch prediction circuit 60 may typically be provided within the fetch circuitry 6 to detect the presence of branch instructions, and to make predictions about the outcome of the branch instructions. There are many known branch prediction schemes which can be used for this purpose. When the branch instruction is subsequently executed within the execute stage 16, whether by a dedicated branch execution unit 28, or by another unit such as the ALU 22, it is then detected whether the prediction made about the branch instruction by the branch predictor 60 is correct or not. For example, the branch predictor may have predicted that the branch would be taken, and when the branch instruction is actually executed at the execute stage it may be taken or not taken. Since the fetching activity of the fetch circuitry will typically have been influenced by the prediction made by the branch predictor, then in the event that the branch is mispredicted, it will be necessary to take some corrective action in order to ensure that the appropriate instructions are fetched.

Hence, by way of example, if for a particular branch instruction it is predicted that the branch will be taken, the fetch circuitry will typically perform subsequent fetching for the particular thread starting from the target address of the branch instruction. However, if during later execution of the branch instruction the branch is in fact not taken, it would be necessary to flush those fetched instructions from the pipeline, and instead start fetching instructions from the instruction immediately following the branch instruction. Conversely, if the branch instruction is predicted as not being taken, and accordingly fetching continues from the instruction immediately following the branch instruction, if it is later detected that the branch is taken, it will be necessary to flush the relevant fetched instructions from the pipeline, and instead begin fetching from the instruction identified by the target address of the branch instruction.

There are a number of places where the prediction/misprediction status of the branch instruction can be evaluated within the pipeline. In one example arrangement, the retire control circuitry 64 may be used to evaluate the prediction/misprediction status of a branch instruction, and provide an appropriate control signal back to the fetch circuitry in the event that a misprediction has taken place.

However, it will be appreciated that whenever the prediction proves to be correct, the fetch circuitry will have fetched appropriate instructions for the relevant thread, and accordingly execution can merely continue without any corrective action being needed. Hence, branch prediction schemes can provide significant performance benefits.

In accordance with the present technique, execution hint instruction handling circuitry 62 is also provided within the fetch circuitry, which can be separate to, or formed as part of, the branch prediction circuitry 60. Under at least certain conditions, the execution hint instruction handler 62 can be arranged to treat an execution hint instruction as a branch instruction with the branch predictor 60 giving it a particular predicted behaviour. Under such conditions, the fetch circuitry is also then caused to suspend fetching of instructions for the relevant thread. By suspending fetching of the instructions, this enables the resources of the processing pipeline to be prioritised for other threads during the period of time that that thread is suspended. However, it is important to ensure that there is a reliable mechanism for fetching to be resumed in association with the suspended thread.

To achieve this, when the branch instruction representing the execution hint instruction is executed within the execute stage 16, it can be arranged to execute with a behaviour different to the predicted behaviour, hence triggering the misprediction condition. At that point, the standard actions of handling a misprediction instruction will result in the fetch circuitry 6 being advised of the misprediction. At that point, the fetch circuitry can then resume fetching of instructions for the suspended thread. This hence provides a very elegant mechanism for temporarily suspending a thread within a fine-grained multithreading system, whilst providing a reliable mechanism for resuming fetching of instructions from the thread.

As mentioned earlier, in one embodiment the analysis of the misprediction condition can be performed by the retire control circuitry 64. Within an out-of-order system, this provides the benefit when suspending a thread in response to an execution hint instruction, that the suspension continues until such time as the execution hint instruction is retired, at which point the instruction sequence will be back in original program order. Accordingly, if for example the hint instruction was inserted due to a preceding instruction being expected to have a long latency, then even if the hint instruction is executed within the pipeline earlier than that preceding instruction, by the time the hint instruction is retired that preceding instruction will have been executed and committed, and accordingly any delay associated with the execution of that instruction will have been incurred. This hence enables the hint instruction to provide a suitable length of time during which the thread is suspended, to allow for the expected delay.

However, there is no requirement for the analysis of the misprediction to take place by the retire control circuitry 64, and in other embodiments other stages in the pipeline may be used to assess the misprediction, and to cause fetching to be resumed on detection of the misprediction condition. Further, there is no requirement for the technique to be limited to pipelines that perform out-of-order processing. In-order processors can still benefit from the handling of execution hint instructions in the manner described above. Within an in-order processor, the retire control stage effectively becomes the write back stage, since instructions are executed in program order, and accordingly are naturally in program order at the time the results are written back into the registers 12.

In one embodiment, the execution hint instruction handler 62 can be arranged to always treat an execution hint instruction in the manner outlined above. However, in an alternative embodiment, it can instead be arranged first to assess the presence or absence of a suspension condition, and only in the presence of a suspension condition to treat the execution hint instruction in the above manner. In the absence of such a suspension condition, the execution hint instruction can still be treated as a predicted branch instruction, but where the predicted behaviour is arranged to match the actual behaviour that occurs when the instruction is subsequently executed, hence avoiding a misprediction condition being detected. Also, in that instance, fetching is merely continued by the fetch circuitry, and no suspension of the thread arises.

The suspension condition can be assessed in a variety of ways, but in one embodiment the execution hint instruction handler 62 can make reference to thread progress monitor circuitry 50, which in one embodiment is already present within the pipeline to keep track of the progress of the various threads through the processing pipeline. Information maintained by the thread progress monitor 50 can be referenced by the execution hint instruction handler 62 in order to assess whether the other threads are making sufficient progress that it could be expected that throughput would be improved if the current thread (for which an execution hint instruction has been observed) is suspended. If so, then the suspension condition is considered to be met, but otherwise the suspension condition is considered to be absent. By such an approach, it is possible to seek to assess the likelihood that throughput will be improved by temporarily suspending a current thread, and if that likelihood is considered not to be sufficient enough, then the execution hint instruction can be processed in a way that does not cause the thread to be suspended.

Figure 2A:
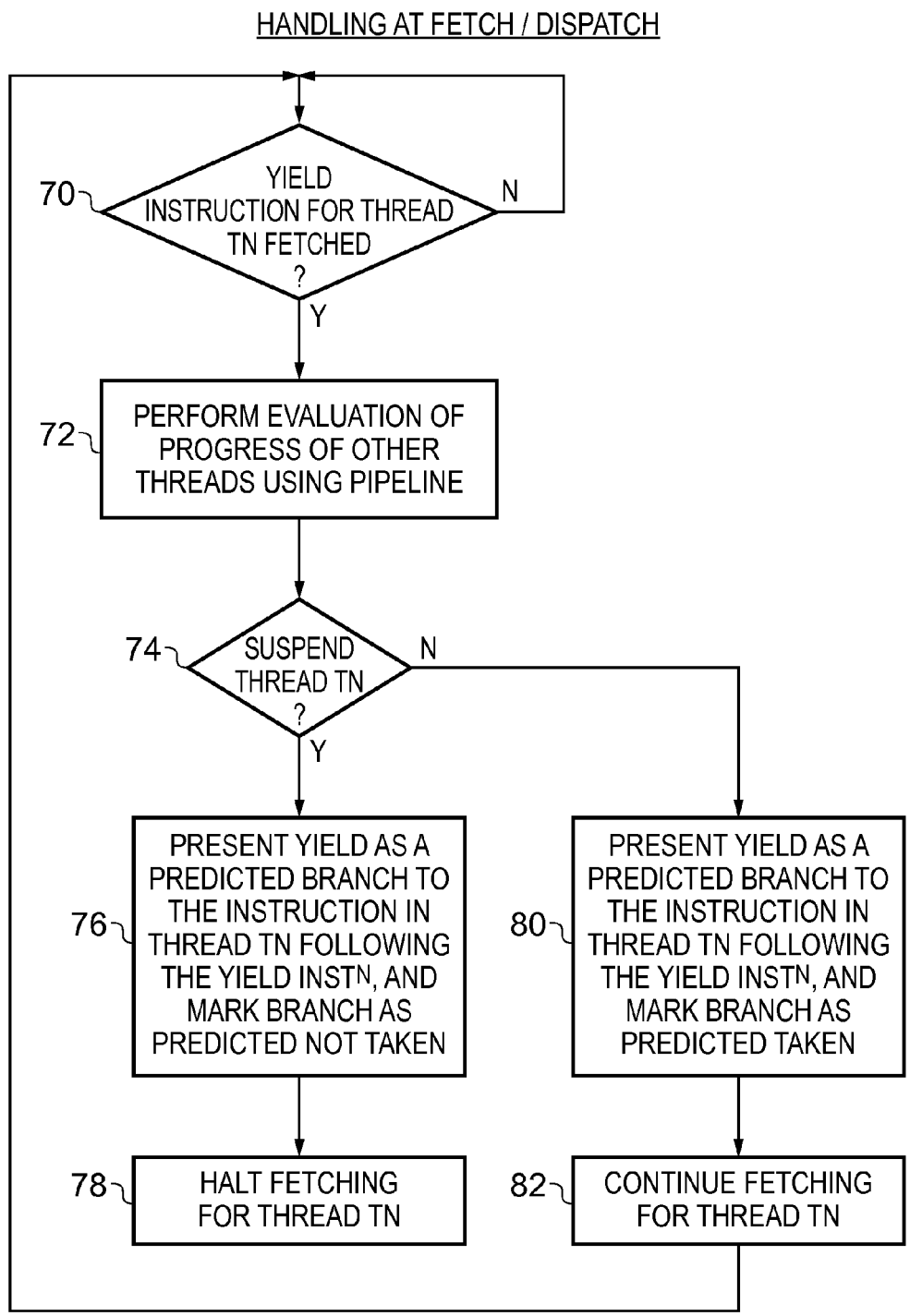
FIG. 2A is a flow diagram illustrating how a yield instruction is handled at the fetch/dispatch stage in accordance with one embodiment.

FIG. 2A illustrates some steps that can be performed at the fetch stage in order to handle an execution hint instruction in the manner outlined above, in this example the execution hint instruction being a yield instruction. Whilst in one embodiment all of the steps illustrated in FIG. 2A may be performed specifically by the fetch stage 6, in other embodiments the processing may be performed not solely by the fetch stage, but by other stages prior to the point at which the instruction is dispatched. An instruction is typically considered to be dispatched when it is sent to the issue stage 14 for placing in the issue queue 40.

At step 70, it is determined whether a yield instruction for a thread has been fetched by the fetch circuitry. For the purposes of the current discussion it will be assumed that the thread currently under consideration at this point is thread TN, but essentially the process of FIG. 2A can be performed separately for each of the various threads.

When a yield instruction is observed, then in one embodiment, at step 72, an evaluation is performed of the progress of other threads that are using the pipeline. As mentioned earlier, this can be achieved by the execution hint instruction handler 62 making reference to the thread progress monitor 50 in order to seek to assess the progress being made by the other threads.

Based on that analysis, then at step 74 it is determined whether to suspend thread TN or not. For example, if the analysis at step 72 indicates that at least one of the other threads is making good progress through the pipeline with little delay, then this may indicate that it is appropriate to suspend thread TN, since it is expected that that other thread could make good use of the additional resources that would be freed up for it by suspending thread TN. Conversely, if no other thread that is currently using the pipeline is making good progress, for example due to some long latency delays being incurred in connection with those threads, such as may arise due to certain cache miss conditions, then it may be decided that it is inappropriate to suspend thread TN since there is little expectation of improved throughput resulting from the suspension of thread TN.

If it is decided at step 74 to suspend thread TN, then the process proceeds to step 76 where the yield instruction is presented as a predicted branch to the instruction in thread TN following the yield instruction. Hence, by the time the instruction is dispatched into the issue queue, it will be represented as a branch instruction whose target address points directly to the instruction following the yield instruction. In addition, the branch predictor 60 is arranged to mark that predicted branch as "predicted not taken", that prediction information also passing through the pipeline with the branch instruction to enable later detection of any misprediction.

Also, at step 78, the fetch circuitry halts fetching for thread TN, and accordingly the process of FIG. 2A effectively ends at that point since the fetch circuitry will have no further instructions to analyse for thread TN until thread TN is subsequently resumed.

If at step 74 it is decided not to suspend thread TN, then the process proceeds to step 80, where the yield instruction is again presented as a predicted branch to the instruction in thread TN following the yield instruction, but in this instance the branch predictor 60 is caused to mark the branch as predicted taken. Further, at step 82 the fetch circuitry continues fetching for thread TN, the process hence returning to step 70.

Figure 2B:
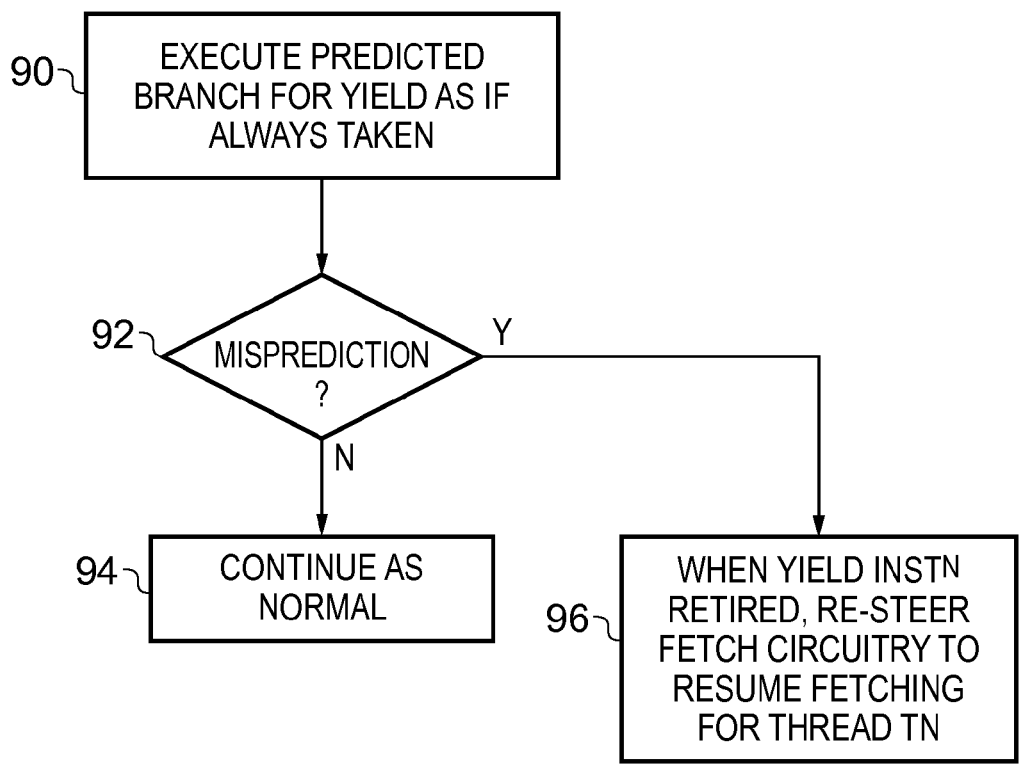
FIG. 2B is a flow diagram illustrating how a yield instruction is handled during the execution/retire stage in accordance with one embodiment.

FIG. 2B illustrates how the branch instruction used to represent the yield instruction is then handled during the execute stage 16, and during the stage which assesses any misprediction, whether that be the execute stage itself, or, as per the earlier described embodiment, the retire stage implemented by the retire control circuitry 64. At step 90, the predicted branch for the yield instruction is executed as if it is always taken. Accordingly, irrespective of which path was taken through FIG. 2A, the branch instruction is always taken at the execute stage.

It is then determined at step 92 whether a misprediction has arisen. If not, then this effectively means that thread TN was not suspended, since the absence of the misprediction indicates that the flow of FIG. 2A followed the path through steps 80, 82 rather than steps 76, 78. Accordingly, the process proceeds directly to step 94, where processing continues as normal. In particular, the fetch circuitry will already have been fetching the correct instructions for thread TN and no further action is needed since the thread was not suspended.

However, if a misprediction is detected at step 92, then this means that the earlier process shown in FIG. 2A followed steps 76, 78 rather than steps 80, 82. Accordingly fetching for thread TN will have been suspended if such a misprediction condition is detected, and accordingly the process proceeds to step 96, where, when the yield instruction is retired, a control signal is sent to the fetch circuitry to cause the fetch circuitry to resume fetching for thread TN, starting with the instruction immediately following the hint instruction that caused the suspension to take place.

Figure 3:
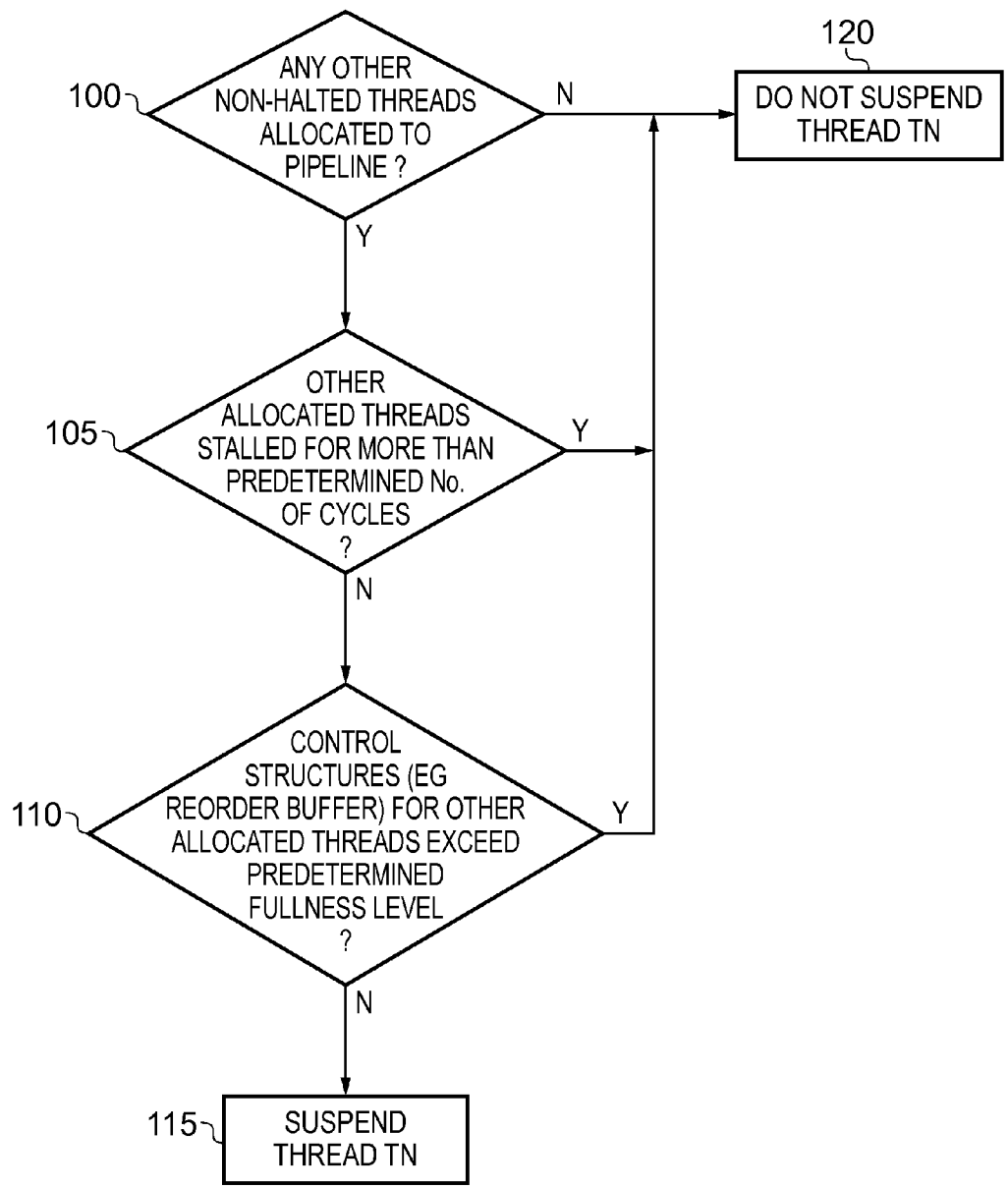
FIG. 3 is a flow diagram illustrating how the progress of other threads may be evaluated in accordance with one embodiment.

The evaluation that is performed at step 72 of FIG. 2A can take a variety of forms, but FIG. 3 illustrates one example sequence of checks that could be performed. At step 100, it is determined whether there are any other non-halted threads allocated to the pipeline. If not, i.e. if all other threads are halted, then it is not appropriate to suspend fetching of thread TN, since this is not expected to achieve any throughput benefit for the pipeline. Accordingly, the process proceeds to step 120 where thread TN is not suspended. Accordingly, this will cause steps 80, 82 of FIG. 2A to be performed, as a result of which no misprediction will later be detected at step 92 and accordingly processing will continue as normal at step 94.

Assuming there is at least one other non-halted thread allocated to the pipeline, then the process proceeds to step 105, where it is determined whether those non-halted threads are stalled for more than a predetermined number of cycles. The threshold number of cycles to be used at step 105 can be varied dependent on embodiment, but is intended to be set at a level where if it is met or exceeded, this will indicate that there is little expected benefit from stalling thread TN. In one embodiment, the "yes" path from step 105 will be followed if all of the allocated threads are stalled for more than the predetermined number of cycles, and in that event again it will be decided not to suspend thread TN.

Assuming the "no" path is followed from step 105, it can if desired additionally be checked whether any of the control structures within the pipeline for the other allocated threads exceed a predetermined fullness level. One such example control structure that could be analysed is the reorder buffer, typically a logically separate reorder buffer being maintained for each of the threads. In one embodiment, if for all of the allocated threads the relevant control structure or control structures analysed exceed a predetermined fullness level, then the process will proceed to step 120 where thread TN will again not be suspended.

If desired, additional or alternative checks can also be added, making reference to information maintained by the thread progress monitor 50 in order to assess the progress being made by the other threads. However, if none of those checks indicate that thread TN should not be suspended, the process instead proceeds to step 115 where it is decided to suspend thread TN. Effectively, at this point it has been decided that the progress being made by at least one other thread is sufficient that there is a reasonable expectation that suspending thread TN could improve the overall throughput through the pipeline.

Figure 4A:
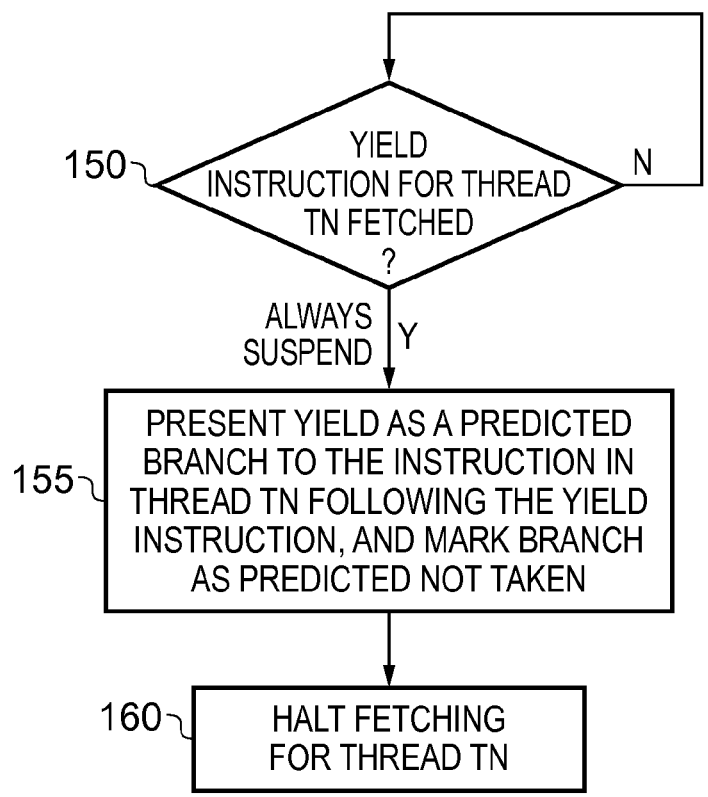
FIGS. 4A and 4B are flow diagrams illustrating the handling of a yield instruction at the fetch/dispatch stage, and the execute/retire stage, respectively, in accordance with an alternative embodiment where the presence of the yield instruction always causes suspension of fetching for the thread.
Figure 4B:
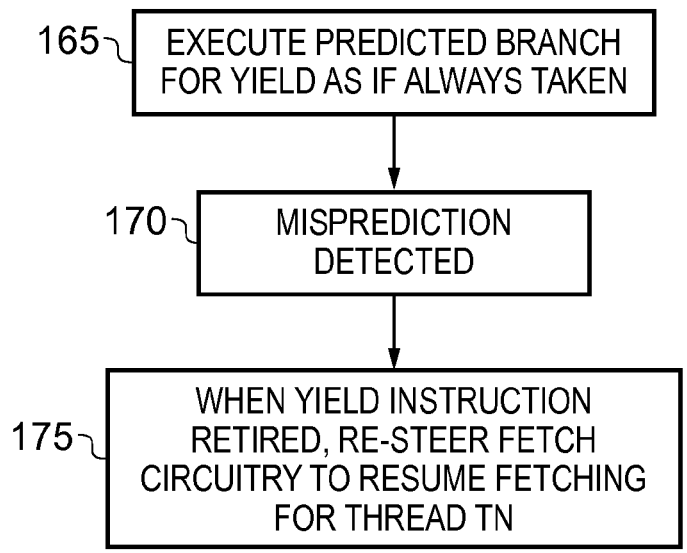

Whilst in the earlier example of FIGS. 2A and 2B an evaluation is performed at step 72 to decide whether the suspension condition is considered present or absent, and hence to only suspend the thread in the presence of the suspension condition, in an alternative embodiment such a step may not be performed, and instead it may always be decided to suspend the thread. Such an arrangement is shown in FIGS. 4A and 4B. In particular, FIG. 4A is a flow diagram illustrating the handling at the fetch/dispatch stage. At step 150, it is determined whether a yield instruction is present for thread TN, and once a yield instruction is detected, the process proceeds to step 155, where the yield instruction is presented as a predicted branch to the instruction in thread TN following the yield instruction, and in addition that branch instruction is marked as "predicted not taken". In addition, at step 160 the fetch circuitry 6 halts fetching for thread TN.

As shown in FIG. 4B, when that branch instruction is subsequently handled at the execute/retire stage, it is executed as if always taken at step 165, which means that a misprediction will be detected at step 170. As a result, the process proceeds directly to step 175 where, when the yield instruction is retired, the fetch circuitry is re-steered to resume fetching of instructions for thread TN.

In the above examples of FIGS. 2A through 4B, the execution hint instruction takes the form of a yield instruction, which is an instruction that may be added by a programmer to indicate that prioritising execution of instructions of at least one other thread may improve overall throughput of instructions. Beyond this, the yield instruction has no functional purpose.

However, the execution hint instruction need not take such a form, and indeed there are other instructions that may be executed by the system that can also be treated as an execution hint instruction in order to allow temporary suspension of a thread in order to seek to improve overall throughput. An example is a category of instruction that is referred to herein as a "wait for a required condition" instruction. Some specific examples of such an instruction are a "wait for event" instruction or a "wait for interrupt" instruction. Typically, the apparatus will have an interface through which such an event or interrupt is presented to the apparatus. If at the time such an instruction is executed the event or interrupt is present, then execution will merely continue, but in the absence of that event or interrupt being present at the time of execution, then the thread will be suspended until the required condition is present. This can give rise to some power saving benefits within the apparatus.

Figure 5A:
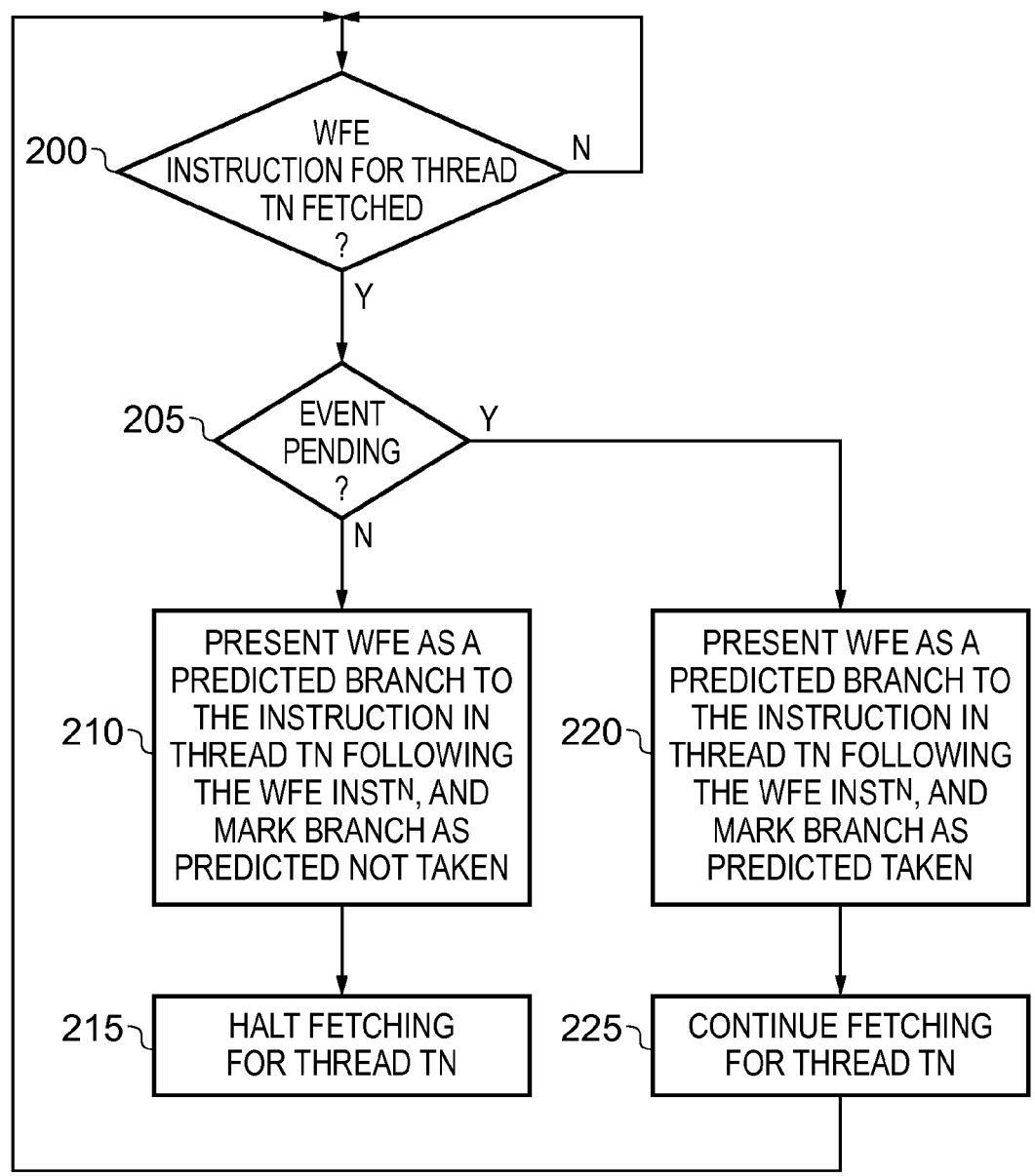
FIG. 5A is a flow diagram illustrating how a wait for event instruction may be handled at the fetch/dispatch stage in accordance with one embodiment.

However, in addition, in one embodiment such instructions can also be used as execution hint instructions to allow temporary suspension of a thread whilst that instruction is passing through the pipeline. Such a process is illustrated by way of example with reference to FIGS. 5A and 5B, considering the specific example where the instruction is a wait for event (WFE) instruction. The same process could also be performed for a wait for interrupt instruction. At step 200, it is determined whether such a WFE instruction has been fetched for thread TN. If so, it is then determined at step 205 whether there is an event pending, i.e. whether the relevant interface is receiving an asserted event signal. This effectively forms a prediction taken at the fetch stage, since as discussed earlier it is actually at the time of execution that there will be an assessment as to whether the event is pending, and this will then affect the steps taken on execution of the WFE instruction. An event can be asserted and deasserted at various points, and accordingly the fact that an event is pending at the fetch stage does not necessarily mean that it will be pending at the execute stage. However, in the embodiment described in FIG. 5A, if the event is not pending, this is treated as indicating a condition where it may be appropriate to suspend fetching for thread TN. In particular, if that situation is still present at the time of execution, the thread will in any event be suspended as part of the WFE functionality.

Accordingly, if an event is not pending at step 205, then the process proceeds to step 210, where the wait for event instruction is presented as a predicted branch to the instruction in thread TN following the WFE instruction, and that instruction is marked as "predicted not taken". At this point, fetching of instructions for thread TN is also halted at step 215. It will hence be appreciated that steps 210, 215 are analogous to steps 76, 78 of FIG. 2A.

If an event is determined to be pending at step 205, then the process proceeds to step 220, where the wait for event instruction is again presented as a predicted branch to the instruction in thread TN following the WFE instruction, but this time is marked as "predicted taken". At step 225, the fetch circuitry 6 continues fetching instructions for thread TN. Hence, it can be seen that steps 220, 225 are analogous to steps 80, 82 of FIG. 2A.

Figure 5B:
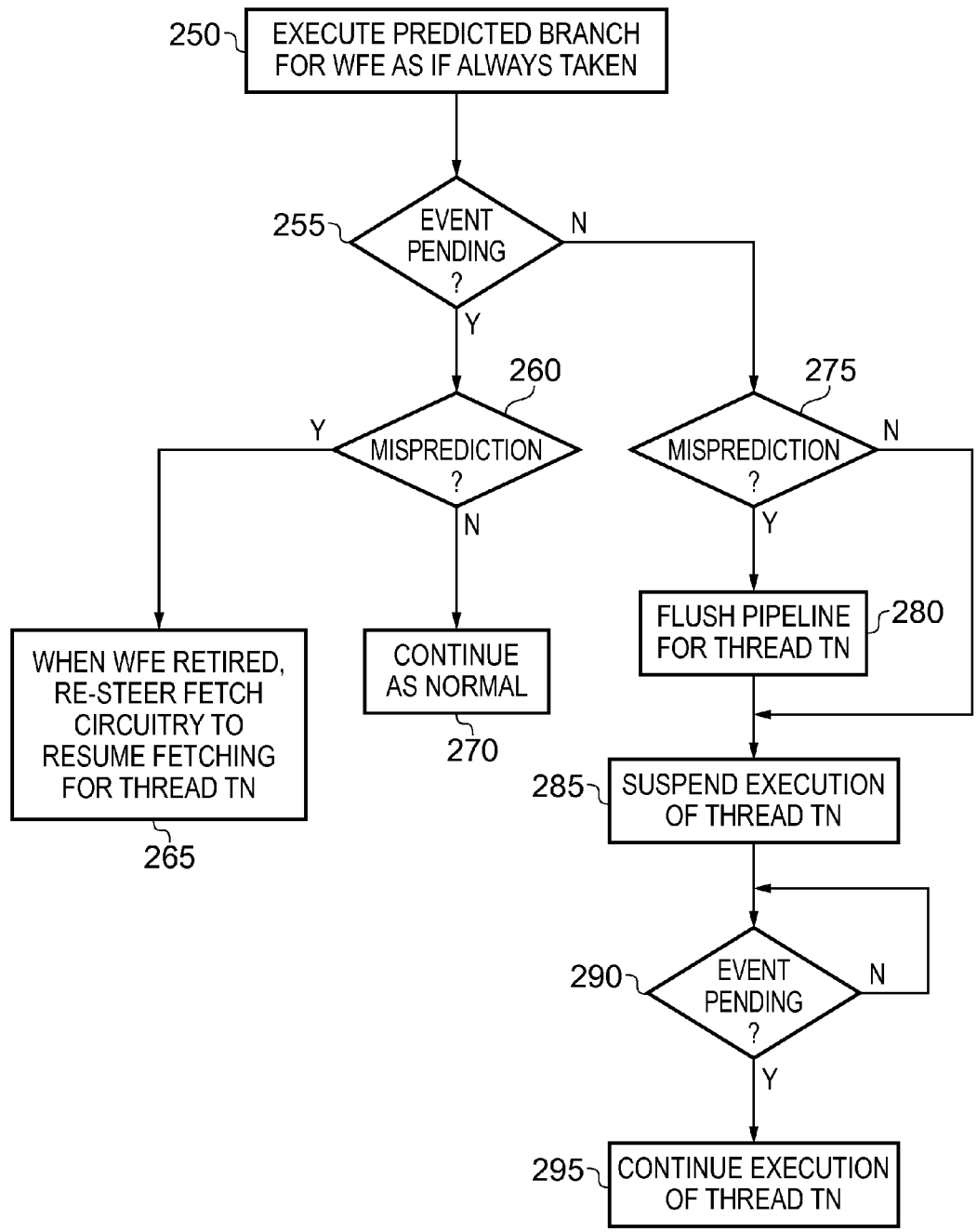
FIG. 5B is a flow diagram illustrating how a wait for event instruction may be handled during the execute/retire stage, in accordance with one embodiment.

When the WFE instruction is subsequently executed, then the steps shown in FIG. 5B can be performed. In particular, the predicted branch instruction representing the WFE instruction is executed as if always taken at step 250. It is then determined at step 255 whether an event is pending. If an event is not pending, then the WFE functionality needs to be implemented and it does not matter at that point whether the fetch circuitry had previously halted fetching or not, other than the ability to avoid certain flush operations as will be discussed below.

If the event is not pending at step 255, then it is determined whether there is a misprediction at step 275. If not, then this means that steps 210, 215 were implemented earlier at the fetch/dispatch stage, and accordingly the fetch circuitry did not in fact fetch any further instructions for said TN. Accordingly, the process can proceed directly to step 285, and in particular bypass the flushing stage 280. However, if there was a misprediction, the process proceeds to step 280 where the pipeline is flushed for thread TN in order to flush all of the instructions of thread TN that the fetch circuitry has subsequently fetched. Then, at step 285 execution of thread TN is suspended, whereafter the process awaits receipt of an event at the interface at step 290. When an event pending condition is detected, the process then proceeds to step 295 where execution of thread TN is continued.

If at step 255 it is detected that an event is pending then no additional steps are required to deal with the WFE functionality. However, additional checks are required to ensure that, if there has been a temporary suspension in fetching of instructions for thread TN, that fetching is resumed. Hence, at step 260, it is determined if there is a misprediction. If not, this indicates that steps 220, 225 were performed earlier at the fetch/dispatch stage, and accordingly no corrective action is needed, and instead processing can continue as normal at step 270. However, in the presence of the misprediction, this indicates that steps 210, 215 were performed earlier at the fetch/dispatch stage, and accordingly the process proceeds to step 265, where, when the WFE instruction is retired, the fetch circuitry is re-steered to resume fetching instructions for thread TN. From a comparison of FIG. 5B with FIG. 2B, it will be appreciated that steps 260, 265, 270 essentially correspond with steps 92, 96, 94 of FIG. 2B.

From the above discussions, it will be appreciated that the described embodiments provide a reliable mechanism for handling execution hint instructions within a fine-grained multithreading system, and in particular make use of existing branch prediction mechanisms to provide a reliable way of resuming fetching of instructions for a particular thread in situations where a decision is taken to temporarily suspend fetching in response to such an execution hint instruction. Purely by way of illustrative example, the following instruction sequence illustrates an approach where potential throughput improvements can be realised:

```
LDR x0, [x1]
YIELD
LDR x2, [x0]
...
```

If the programmer knows that the first load instruction is likely to miss in the cache, and that subsequent instructions depend upon the load result, then it may be advantageous to insert the yield instruction as shown above. If, adopting the earlier described approach, fetch/dispatch of instructions for thread TN is suspended at the yield instruction until that yield instruction retires, then the instructions after the first load instruction will not be dispatched until after the first load instruction has completed, and thus will not occupy processor resources whilst that first load instruction is outstanding. If other threads are able to make useful progress using those resources in this time, then overall system performance can be improved.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:
1. An apparatus comprising:
   a processing pipeline to process instructions, comprising fetch circuitry to fetch instructions from a plurality of threads for processing by the processing pipeline, and execution circuitry to execute the fetched instructions;

execution hint instruction handling circuitry, responsive to the fetch circuitry fetching an execution hint instruction for a first thread in said plurality, to treat the execution hint instruction, at least in a presence of a suspension condition, as a predicted branch instruction with a predicted behaviour, and to cause the fetch circuitry to suspend fetching of instructions for the first thread;

the execution circuitry being arranged to execute the predicted branch instruction with a behaviour different to said predicted behaviour in order to trigger a misprediction condition, and the fetch circuitry being responsive to the misprediction condition to resume fetching of instructions for the first thread.

2. An apparatus as claimed in claim 1, wherein the predicted behaviour is that a branch specified by the predicted branch instruction will not be taken, and the execution circuitry is arranged to take the branch during execution of the predicted branch instruction.

3. An apparatus as claimed in claim 1, wherein the processing pipeline further comprises retire circuitry to retire each instruction after execution by the execution circuitry, the retire circuitry being arranged to detect the misprediction condition and to cause the fetch circuitry to resume fetching of instructions for the first thread.

4. An apparatus as claimed in claim 3, wherein the processing pipeline supports out of order execution of instructions, and the retire circuitry is arranged, for each thread, to retire instructions in an original program order for the thread.

5. An apparatus as claimed in claim 1, wherein the execution hint instruction handling circuitry is arranged, without evaluation of the suspension condition, to treat the execution hint instruction as the predicted branch instruction with the predicted behaviour, and to cause the fetch circuitry to suspend fetching of instructions for the first thread.

6. An apparatus as claimed in claim 1, wherein the execution hint instruction handling circuitry is arranged to perform an evaluation process to evaluate progress of the other threads in said plurality in order to determine whether said suspension condition is present.

7. An apparatus as claimed in claim 6, further comprising:
thread progress monitoring circuitry to maintain information about instructions from the plurality of threads being executed within the processing pipeline; and
the execution hint instruction handing circuitry is arranged to reference the thread progress monitoring circuitry when performing said evaluation process.

8. An apparatus as claimed in claim 6, wherein the evaluation process is arranged to identify that the suspension condition is present when the processing pipeline is providing a throughput for at least one of the other threads in said plurality that exceeds a threshold level.

9. An apparatus as claimed in claim 1, wherein:
in the absence of said suspension condition, the execution hint instruction handling circuitry is arranged to treat the execution hint instruction as a predicted branch instruction with an alternative predicted behaviour, and to allow the fetch circuitry to continue fetching instructions for the first thread; and
the execution circuitry is arranged to execute the predicted branch instruction with a behaviour matching said alternative predicted behaviour.

10. An apparatus as claimed in claim 1, wherein said execution hint instruction is a yield instruction indicating that prioritising execution of instructions of at least one other thread in said plurality may improve overall throughput of instructions through the apparatus.

11. An apparatus as claimed in claim 1, wherein:
said execution hint instruction is a wait for a required condition type of instruction which, when executed by the execution circuitry in the presence of said required condition, causes the first thread to continue execution, but which when executed by the execution circuitry in the absence of said required condition, causes the first thread to be suspended until the required condition is present for the apparatus; and
the suspension condition is determined to be present if the required condition is absent at the time the execution hint instruction is evaluated by the execution hint instruction handling circuitry.

12. An apparatus as claimed in claim 11, wherein:
when the execution hint instruction is executed by the execution circuitry in the presence of said required condition, the fetch circuitry is responsive to the misprediction condition to resume fetching of instructions for the first thread; and
when the execution hint instruction is executed by the execution circuitry in the absence of said required condition, then irrespective of whether a further misprediction condition arises due to the required condition having been present at the time the execution hint instruction was evaluated by the execution hint instruction handling circuitry, the first thread is suspended until the required condition is present for the apparatus.

13. An apparatus as claimed in claim 11, wherein said wait for a required condition type of instruction is at least one of a wait for event instruction and a wait for interrupt instruction.

14. A method of operating an apparatus having fetch circuitry to fetch instructions from a plurality of threads for processing by a processing pipeline and execution circuitry within the processing pipeline to execute the fetched instructions, in response to the fetch circuitry fetching an execution hint instruction for a first thread in said plurality, the method comprising:
treating the execution hint instruction, at least in a presence of a suspension condition, as a predicted branch instruction with a predicted behaviour;
suspending fetching by the fetch circuitry of instructions for the first thread;
executing, within the execution circuitry, the predicted branch instruction with a behaviour different to said predicted behaviour in order to trigger a misprediction condition; and
responsive to the misprediction condition, causing the fetch circuitry to resume fetching of instructions for the first thread.

15. An apparatus comprising:
processing pipeline means for processing instructions, comprising fetch means for fetching instructions from a plurality of threads for processing by the processing pipeline means, and execution means for executing the fetched instructions;
execution hint instruction handling means, responsive to the fetch means fetching an execution hint instruction for a first thread in said plurality, for treating the execution hint instruction, at least in a presence of a suspension condition, as a predicted branch instruction with a predicted behaviour, and for causing the fetch means to suspend fetching of instructions for the first thread;

the execution means for executing the predicted branch instruction with a behaviour different to said predicted behaviour in order to trigger a misprediction condition, and the fetch means for resuming fetching of instructions for the first thread in response to the misprediction condition.

\* \* \* \* \*